United States Patent
Udriste et al.

(10) Patent No.: US 8,696,065 B2
(45) Date of Patent: Apr. 15, 2014

(54) ADJUSTABLE HEADREST FOR AN AIRCRAFT SEAT

(75) Inventors: Daniel Udriste, Coral Springs, FL (US); Javier Valdes De La Garza, Doral, FL (US); Vladimir Nastevski, Pembroke Pines, FL (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 13/344,132

(22) Filed: Jan. 5, 2012

(65) Prior Publication Data

US 2013/0175393 A1 Jul. 11, 2013

(51) Int. Cl.
*B60N 2/48* (2006.01)
*B64D 11/06* (2006.01)

(52) U.S. Cl.
USPC ..................................... 297/409; 244/122 R

(58) Field of Classification Search
USPC ................................ 297/409, 408; 244/122 R
See application file for complete search history.

(56) References Cited

U.S. PATENT DOCUMENTS

| | | | | |
|---|---|---|---|---|
| 4,720,146 | A | | 1/1988 | Mawbey et al. |
| 4,865,388 | A | * | 9/1989 | Nemoto .................. 297/403 |
| 5,054,856 | A | * | 10/1991 | Wang ....................... 297/408 |
| 5,082,326 | A | * | 1/1992 | Sekido et al. ............ 297/284.6 |
| 5,772,281 | A | * | 6/1998 | Massara .................. 297/284.4 |
| 6,715,829 | B2 | * | 4/2004 | Svantesson et al. ...... 297/216.12 |
| 6,726,280 | B1 | * | 4/2004 | Liao ........................ 297/353 |
| 7,017,468 | B2 | | 3/2006 | Steffen |
| 7,500,721 | B2 | | 3/2009 | Beroth et al. |
| 7,717,507 | B2 | | 5/2010 | Toda et al. |
| 2004/0007910 | A1 | | 1/2004 | Skelly |
| 2004/0017099 | A1 | | 1/2004 | O'Connor |
| 2004/0217639 | A1 | | 11/2004 | Clough |
| 2006/0175881 | A1 | | 8/2006 | Akaike et al. |
| 2007/0013219 | A1 | * | 1/2007 | Chung ...................... 297/409 |
| 2007/0075578 | A1 | * | 4/2007 | Klukowski ............... 297/391 |
| 2007/0246989 | A1 | * | 10/2007 | Brockman ................ 297/391 |
| 2010/0140987 | A1 | | 6/2010 | Alexander et al. |

FOREIGN PATENT DOCUMENTS

WO 98/09838 3/1998
WO 2009 066054 A2 5/2009

OTHER PUBLICATIONS

International Search Report for PCT/US2013/020218 dated Apr. 1, 2013.

* cited by examiner

*Primary Examiner* — Milton Nelson, Jr.
(74) *Attorney, Agent, or Firm* — Shumaker, Loop & Kendrick, LLP

(57) ABSTRACT

An adjustable headrest for an aircraft seat including a headrest configured to simultaneously horizontally translate and rotate relative to a seatback, an actuating element that urges against the seatback to drive the simultaneous horizontal translation and rotation of the headrest, and linkage interconnecting the headrest with the actuating element and driving movement of the headrest in response to movement of the actuating element. An aircraft passenger seat including an adjustable headrest configured to horizontally translate and rotate relative to the seatback.

18 Claims, 6 Drawing Sheets

ADJUSTABLE HEADREST FOR AN AIRCRAFT SEAT

TECHNICAL FIELD AND BACKGROUND OF THE INVENTION

1. Field of the Invention

The present invention relates generally to an adjustable headrest for a seat such as an aircraft seat, and more particularly, to a pneumatically driven headrest configured to adjust by way of combined horizontal translation and rotation relative to a seatback.

2. Background of the Invention

Vehicle passenger seats such as aircraft seats typically include reclining seatbacks for occupant comfort. Premium seats often include adjustable footrests, headrests and seat bottoms as well for additional occupant comfort. With regard to adjustable headrests, to which the present invention is directed, conventional adjustable headrests are typically only tilt-adjustable through rotation around a fixed axis, and/or vertically adjustable relative to the seatback, with the vertical transition operating independently of the headrest angle change.

To provide improved passenger comfort, what is desired is a headrest that is adjustable both horizontally relative to the seatback, as well as at an angle relative to the seatback, and preferably adjustable by way of a combination of the two. Such movement of the headrest would position the headrest closer to the occupant's head as the headrest is tilt-adjusted, which is particularly comfortable when the seatback is reclined.

BRIEF SUMMARY OF THE INVENTION

To achieve the foregoing aspects and advantages, in one embodiment an adjustable headrest for an aircraft seat is provided herein including a headrest configured to move by way of combined horizontal translation and rotation relative to a seatback, an actuating element that urges against the seatback to drive the horizontal translation and rotation of the headrest, and linkage interconnecting the headrest with the actuating element and driving movement of the headrest in response to movement of the actuating element.

The headrest may move relative to the seatback along a trajectory that includes combined horizontal translation and rotation.

The linkage may be arranged symmetrically adjacent the sides of the seatback, with each side of the linkage including a headrest support arm attached to the headrest, an actuating element support arm attached to the actuating element, a first link linking movement of the headrest support arm with movement of the actuating element support arm, the first link being pivotally connected to each of the seatback and the headrest support arm, and a second link linking movement of the headrest support arm with movement of the actuating element support arm, the second link being pivotally connected to each of the actuating element support arm and the headrest support arm.

The pivotal connection of the headrest support arm and the first link may be guided within a slot defined by the actuating element support arm spaced apart from the attachment point of the actuating element and the actuating element support arm.

The actuating element may include a pneumatic bladder that inflates to urge the actuating element apart from the seatback and the headrest to move forward and rotate downward relative to the seatback, and deflates to move the actuating element toward the seatback and the headrest to move rearward and rotate upward relative to the seatback. The actuating element may include spaced apart elongate pneumatic bladders supported on a frame, and the seatback may include a plate against which the pneumatic bladders seat.

The headrest may be selectively moveable relative to the seatback between a first position substantially flush and at the same angle as the seatback, and a second position forward of the seatback and at an angle thereto. The headrest may be biased toward the first position.

Movement of the actuating element relative to the seatback producing an angle therebetween may produce the equal and opposite angle between the seatback and the headrest.

The actuating element may be positioned behind the seatback and below a headrest line.

In another embodiment, an aircraft passenger seat is provided herein including a seatback selectively adjustable between upright and reclined positions, and a headrest adjustable relative to the seatback, the headrest configured to simultaneously horizontally translate and rotate relative to the seatback, the headrest adjustable via an actuating element positioned behind the seatback that urges against the seatback to drive the simultaneous horizontal translation and rotation of the headrest, the actuating element and the headrest interconnected through linkage that moves the headrest along a non-hinged trajectory.

The linkage may be arranged symmetrically adjacent the sides of the seatback, with each side of the linkage including a headrest support arm attached to the headrest, an actuating element support arm attached to the actuating element, a first link linking movement of the headrest support arm with movement of the actuating element support arm, the first link being pivotally connected to each of the seatback and the headrest support arm, and a second link linking movement of the headrest support arm with movement of the actuating element support arm, the second link being pivotally connected to each of the actuating element support arm and the headrest support arm.

The pivotal connection of the headrest support arm and the first link may be guided within a slot defined by the actuating element support arm spaced apart from the attachment point of the actuating element and the actuating element support arm.

The actuating element may include a pneumatic bladder that inflates to urge the actuating element apart from the seatback and the headrest to move forward and rotate downward relative to the seatback, and deflates to move the actuating element toward the seatback and the headrest to move rearward and rotate upward relative to the seatback. The actuating element may include spaced apart elongate pneumatic bladders supported on a frame that seat against the seatback.

The headrest may be selectively moveable relative to the seatback between a first position substantially flush and at the same angle as the seatback, and a second position forward of the seatback and at an angle thereto, and wherein the headrest is biased toward the first position. Movement of the actuating element relative to the seatback producing an angle therebetween may produce the equal and opposite angle between the seatback and the headrest.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, there is shown an adjustable headrest 20 for a passenger seat constructed in accordance with a preferred embodiment of the invention. Although the headrest 20 is shown utilized with an aircraft passenger seat, it is envisioned that the headrest 20 can be utilized with any seat having a seatback. The headrest 20 may be supported by or carried on a seatback 22 with the head supporting portion of the headrest 20 positioned vertically above the seatback 22 with the seatback 22 in the upright position. The headrest 20 is generally moveable relative to the seatback through combined horizontal translation and rotation relative to the seatback 22. The headrest 20 moves generally in the direction of the occupant's head as the headrest 20 is tilted "downward," and moves generally in the direction away from the occupant's head as the headrest 20 is tilted "upward." The headrest 20 movement provides improved occupant seat comfort. Horizontal translation and rotational movement of the headrest 20 are preferably independent of vertical transition of the headrest 20, which may be accomplished using a variety of conventional structures and configurations not forming a part of this disclosure.

Figure 1:
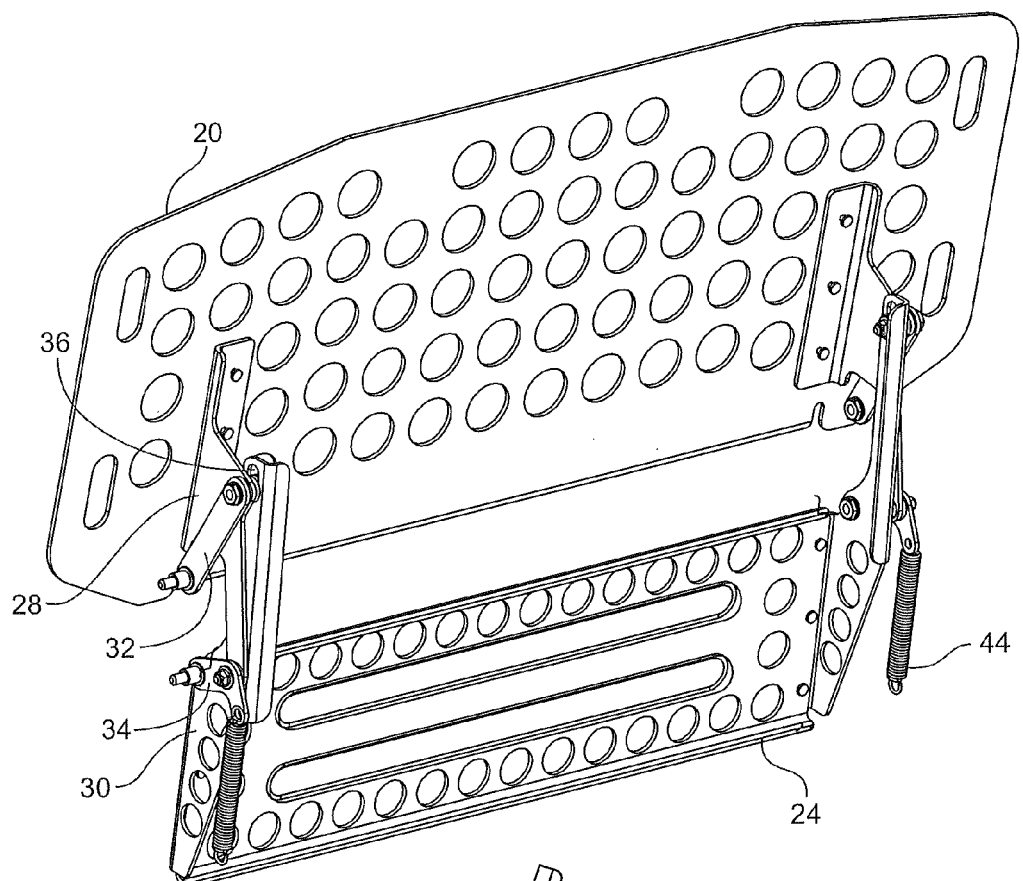
FIG. 1 is a rear perspective view of the adjustable headrest showing the arrangement of the headrest, actuating element and interconnecting linkage.
Figure 2:
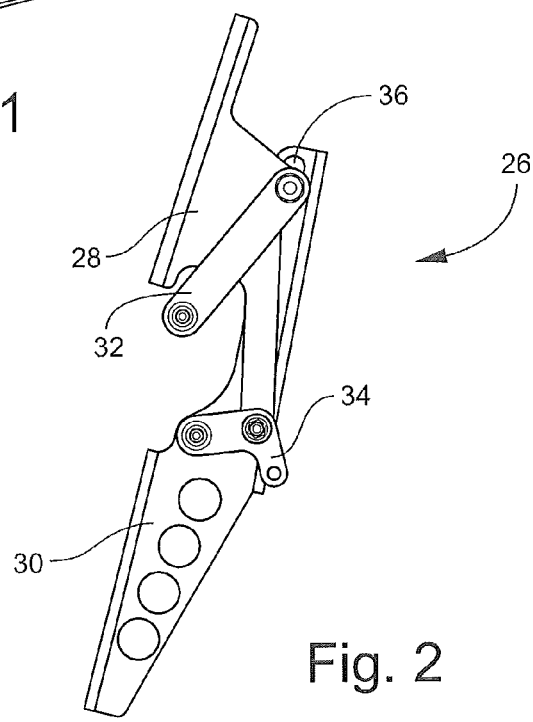
FIG. 2 is an isolated view showing the linkage interconnecting the actuating element with the headrest and driving the movement thereof.
Figure 3:
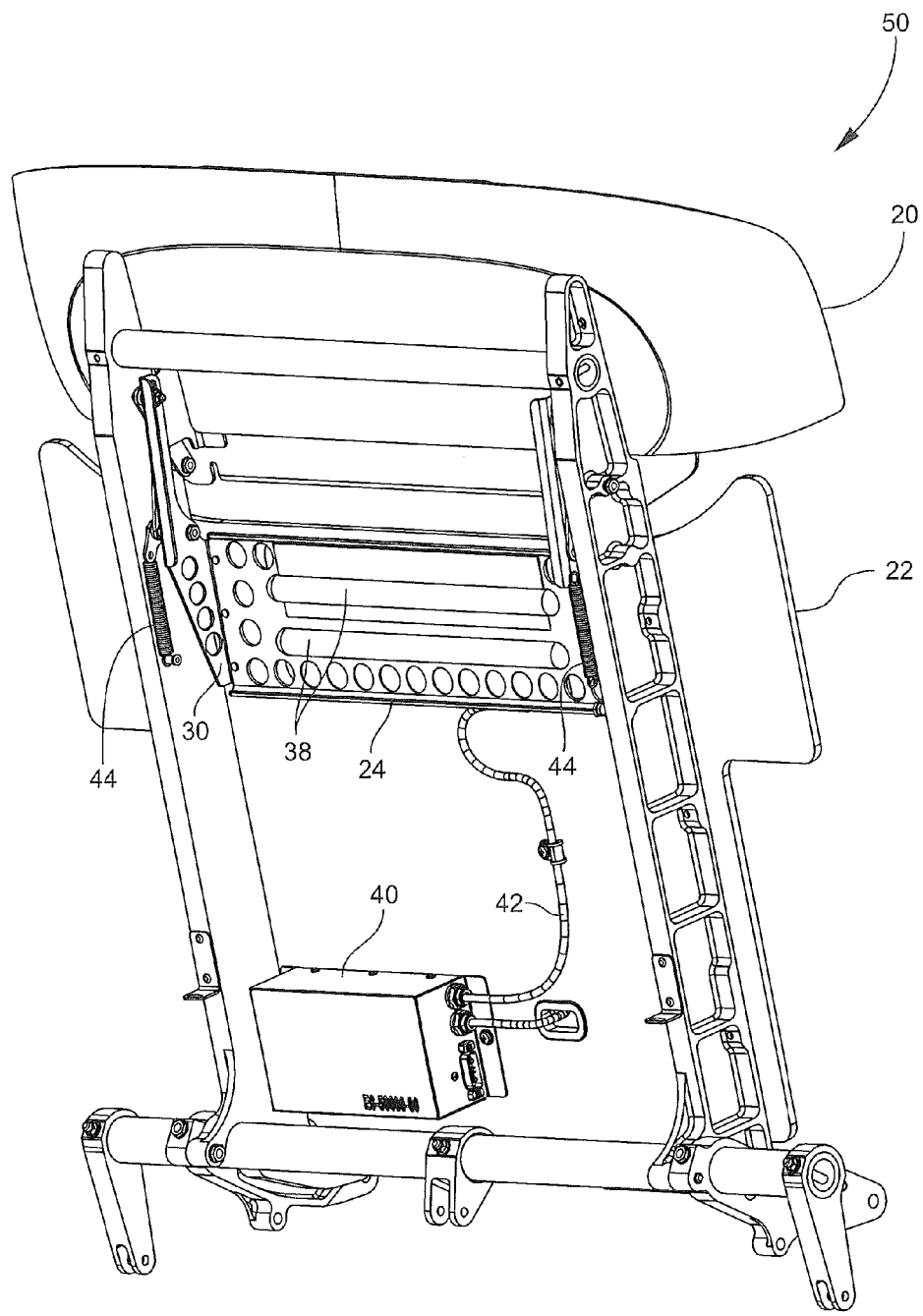
FIG. 3 is a rear perspective view of an aircraft passenger seat including the adjustable headrest showing the arrangement of the seatback, actuating element, linkage and headrest.
Figure 4:
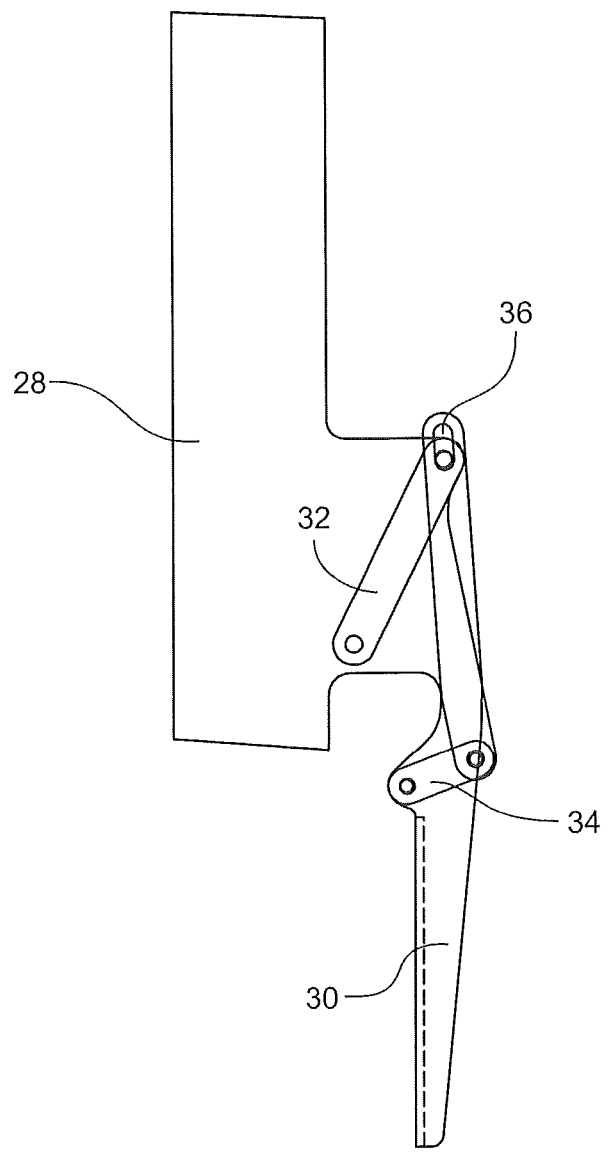
FIG. 4 is a schematic diagram showing one embodiment of linkage for driving the movement of the headrest.

Referring to FIGS. 1-3, the headrest assembly generally includes the headrest 20 configured to move by way of combined horizontal translation and rotation relative to the seatback 22, an actuating element 24 that urges against the seatback to drive the horizontal translation and rotation of the headrest, and linkage 26 interconnecting the headrest 20 with the actuating element 24 and driving movement of the headrest 20 in response to movement of the actuating element 24 relative to the seatback 22. The seatback 22 may include a variety of frame configurations, and as shown preferably includes a plate against which the actuating element 24 seats or contacts to force the articulation of the headrest 20. At least portions of the headrest 20, actuating element 24 and seatback 22 can be constructed of lightweight material such as aluminum to save weight. As shown, these components are further provided with a plurality of holes therethrough for further weight savings. The headrest 20 and seatback 22 can be covered with cushioning material and/or upholstery for comfort and aesthetics. The actuating element 24 as shown is positioned behind the seatback 22 and below a headrest line.

The linkage 26 is shown arranged symmetrically on the sides of the seatback. Each side of the linkage 26 is essentially a mirror image of the other, thus adequately supporting the headrest and preventing twisting thereof. The linkage 26 generally includes a headrest support arm 28 attached to the headrest 20, an actuating element support arm 30 attached to the actuating element 24, a first link 32 linking movement of the headrest support arm 28 with movement of the actuating element support arm 30, and a second link 34 linking movement of the headrest support arm 28 with movement of the actuating element support arm 30. The first link 32 is pivotally connected to each of the seatback 22 and the headrest support arm 28. The second link 34 is pivotally connected to each of the actuating element support arm 30 and the headrest support arm 28. The headrest support arm 28 and the actuating element support arm 24 may attached to their respective headrest 20 and actuating element 24 by way of any suitable fastener including, but not limited to, screws, bolts, rivets, welding, etc. It is envisioned that the headrest 20 and its support arms, and the actuating element 24 and its support arms may be integrally manufactured.

The pivotal connection point of the headrest support arm 28 and the first link 32 is guided within a slot 36 defined by the actuating element support arm 30, the slot 36 being spaced apart from the attachment point of the actuating element and the actuating element support arm. Maintenance of the pivot point within the slot 36, in cooperation with the travel achievable by the actuating element 24, limits the travel (i.e., horizontal translation and rotation) of the headrest 20. The travel of the assembly is customizable by adjusting the length of the slot 36, length of the linkage components, and/or actuating element 24.

The arrangement of the actuating element 24, headrest 20 and linkage 26 is such that the headrest 20 moves relative to the seatback 22 along a non-hinged trajectory, as opposed to rotation around a fixed axis as found in conventional adjustable headrests. Such an arrangement causes the headrest 20 to both horizontally translate and rotate relative to the seatback 22 in response to movement of the actuating element 24 relative to the seatback 22.

Referring to FIG. 3, the actuating element 24 can include at least one pneumatic bladder 38 that inflates to urge the actuating element 24 apart from the seatback 22, causing the headrest 20 to move forward and rotate downward relative to the seatback 22, and deflates to move the actuating element 24 toward the seatback 22, causing the headrest 20 to move rearward and rotate upward relative to the seatback 22. As shown, the actuating element 24 includes spaced apart elongate pneumatic bladders 38 supported within slots defined through a frame. The pneumatic bladders 38 are arranged generally parallel to one another and substantially horizontal. The bladders 38 are operationally connected to a driving mechanism, such as an air pump 40, through one or more air lines 42. The pump 40 may serve other seat systems in addition to the actuating element 24.

Referring to FIGS. 4-7, one embodiment of the headrest linkage 26 and the movement thereof is shown. As stated above, the linkage 26 generally includes the headrest support arm 28, actuating element support arm 30, first link 32 and second link 34 arrangement driving the non-hinged trajectory of the headrest 20 through movement of the actuating element 24.

Figure 5:
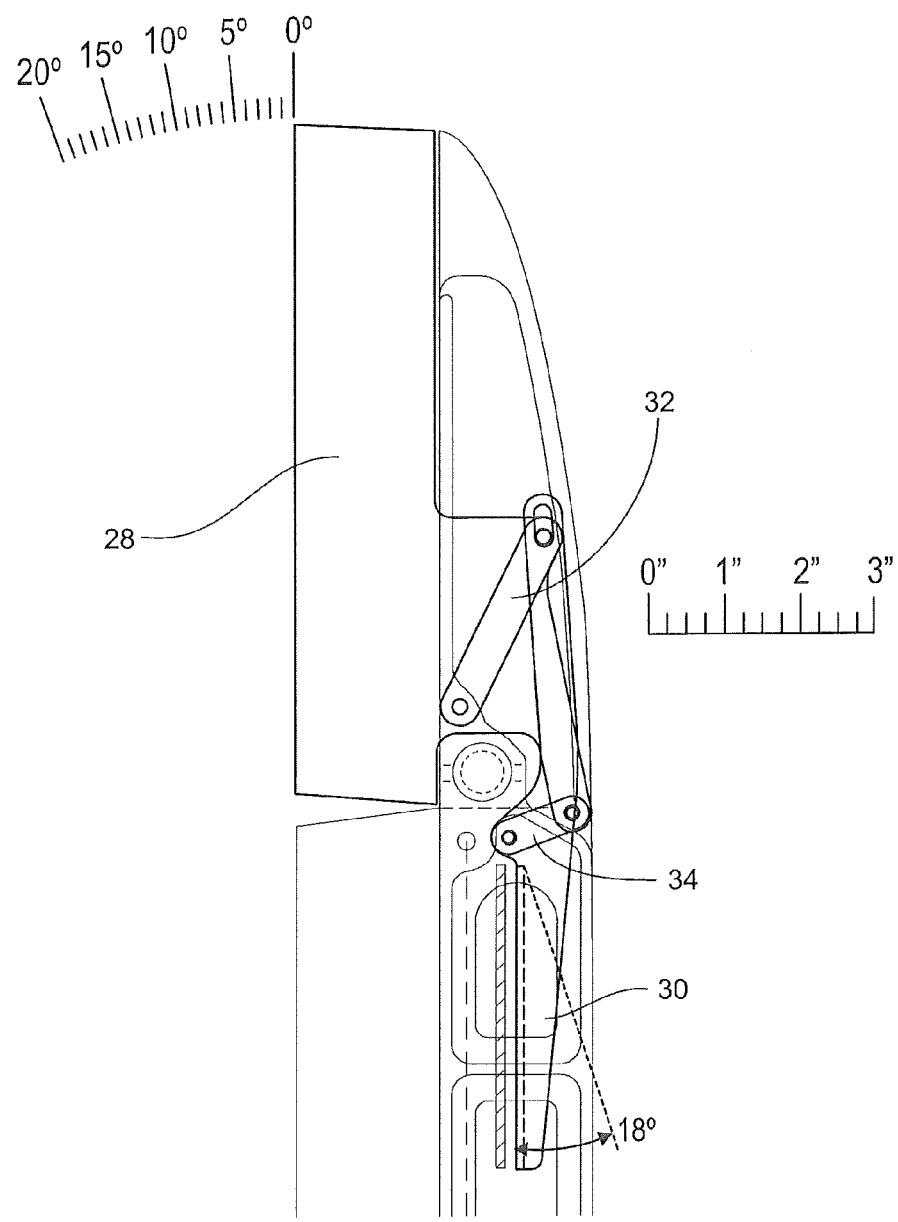
FIG. 5 is a side elevation view of the adjustable headrest showing the headrest positioned flush with the seatback and at a zero angle relative thereto.
Figure 6:
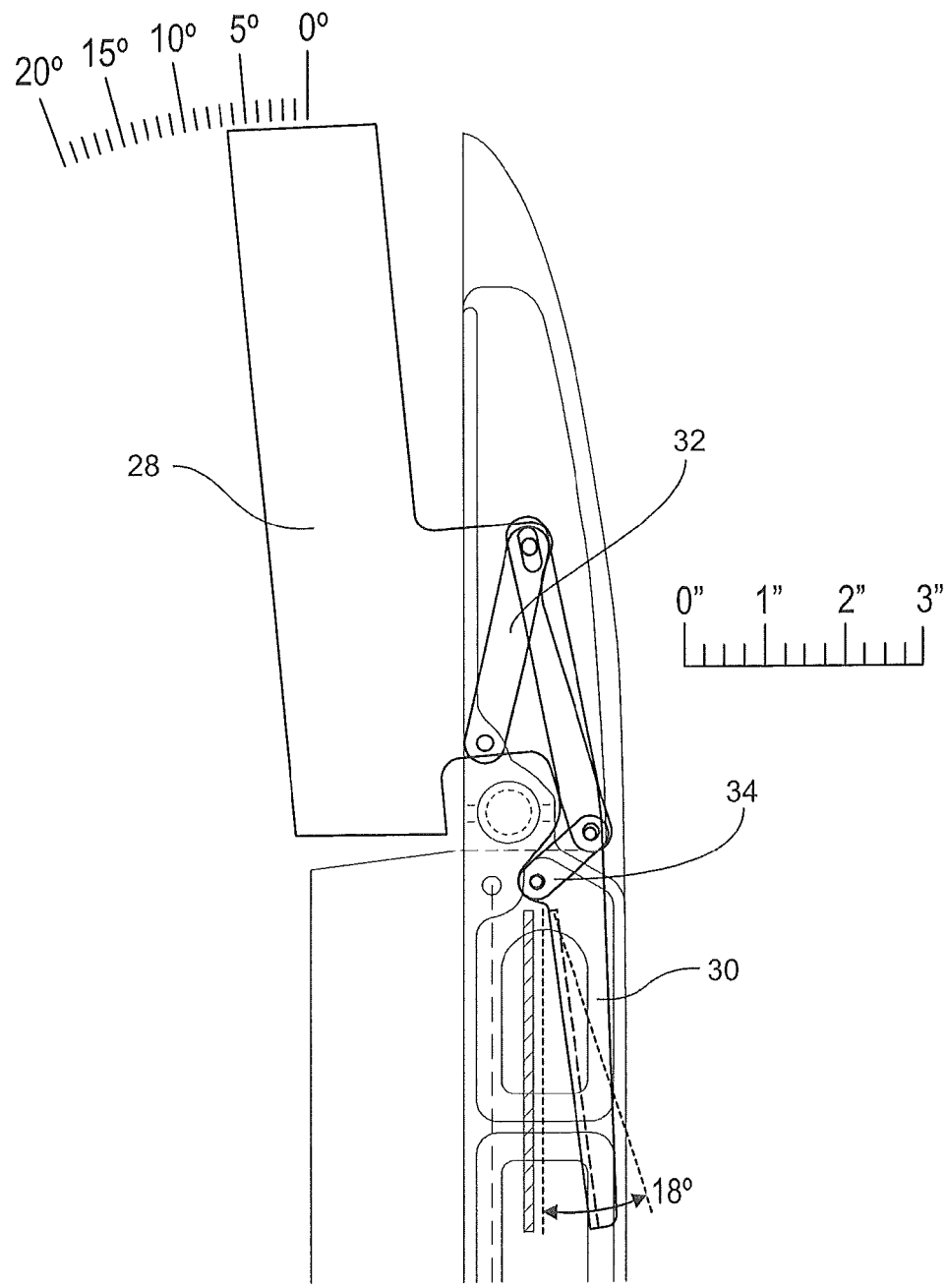
FIG. 6 is a side elevation view of the adjustable headrest showing the headrest and actuating element at an angle relative to the seatback.
Figure 7:
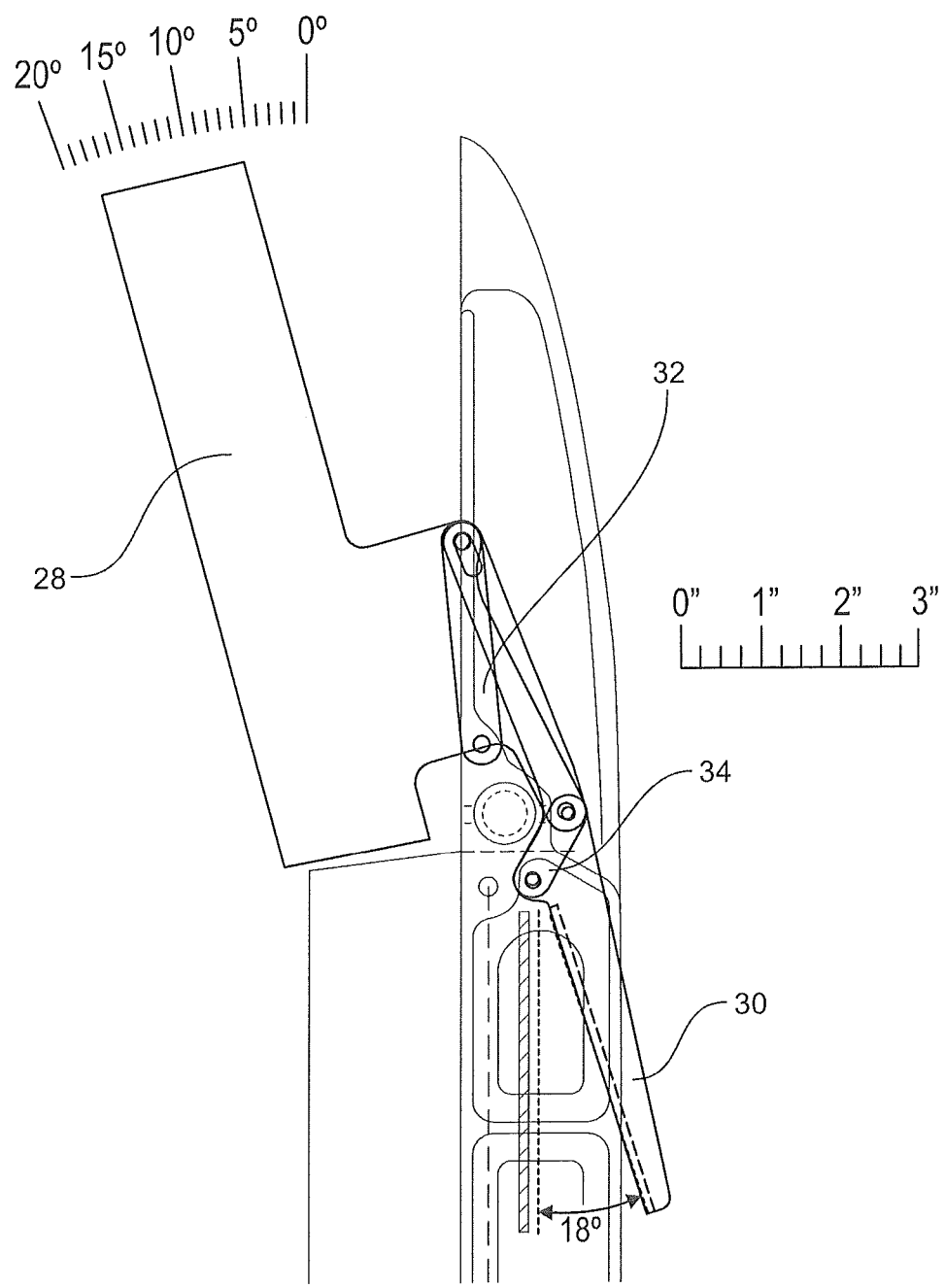
FIG. 7 is a side elevation view of the adjustable headrest showing the headrest fully horizontally translated and rotated relative to the seatback.

Referring to FIGS. 5-7, the headrest 20 is selectively moveable relative to the seatback 22 between a first position substantially flush and at the same angle as the seatback 22 as shown in FIG. 5, and a second position forward of the seatback 22 and at an angle thereto as shown in FIGS. 6 and 7. The fully horizontally translated and rotated headrest 20 is shown in FIG. 7 having a maximum angle of 18 degrees relative to the seatback 20. As shown in FIGS. 6 and 7, movement of the actuating element 24 relative to the seatback 22 producing an angle therebetween can produce, in one specific embodiment, the equal and opposite angle between the headrest 20 and the seatback 22. Again, the assembly is customizable to achieve different maximum angled, horizontal translation, and angle ratios.

The assembly may be biased toward the first position to help return the headrest 20 to its upright position as the pneumatic bladders 38 are deflated. Biasing may be accomplished using springs 44 connected between the second link 34 and seatback 22 as shown in FIG. 3. One spring 44 may be provided on each side of the linkage. The first position may correspond to the taxi, take-off and landing position.

In a further embodiment, an aircraft passenger seat is provided herein as shown in FIG. 3. The aircraft seat, shown generally at 50, generally includes a seatback 22 selectively adjustable between upright and reclined positions, and a headrest 20 adjustable relative to the seatback 22, the headrest 20 configured to simultaneously horizontally translate and rotate relative to the seatback 22, the headrest 20 adjustable via an actuating element 24 positioned behind the seatback 22 that urges against the seatback 22 to drive the simultaneous horizontal translation and rotation of the headrest 20, the actuating element 24 and the headrest 20 being interconnected through linkage 26 that moves the headrest 20 along a non-hinged trajectory.

Regardless of the position of the seatback 22 or the vertical position of the headrest 20 relative to the seatback 20, the headrest 20 is selectively moveable relative to the seatback 22 between a first position substantially flush and at the same angle as the seatback 22, and a second position forward of the seatback 22 and at an angle thereto. The headrest 20 can be biased toward the position.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. An adjustable headrest for use with an aircraft seat including a seatback, comprising:
    a headrest configured to move by way of combined horizontal translation and rotation relative to the seatback;
    an actuating element adapted to urge against the seatback to drive the horizontal translation and rotation of the headrest, the actuating element positioned behind the seatback and below the headrest; and
    linkage interconnecting the headrest with the actuating element and driving movement of the headrest in response to movement of the actuating element relative to the seatback.

2. The adjustable headrest according to claim 1, wherein the headrest simultaneously horizontally translates and rotates relative to the seatback.

3. The adjustable headrest according to claim 1, wherein the linkage is symmetrically arranged about a back of the headrest.

4. The adjustable headrest according to claim 1, wherein the linkage comprises:
    a headrest support arm attached to the headrest;
    an actuating element support arm attached to the actuating element;
    a first link linking movement of the headrest support arm with movement of the actuating element support arm, the first link being pivotally connected to each of the seatback and the headrest support arm; and
    a second link linking movement of the headrest support arm with movement of the actuating element support arm, the second link being pivotally connected to each of the actuating element support arm and the headrest support arm.

5. The adjustable headrest according to claim 4, wherein the pivotal connection of the headrest support arm and the first link is guided within a slot defined by the actuating element support arm spaced apart from the attachment point of the actuating element and the actuating element support arm.

6. The adjustable headrest according to claim 1, wherein the actuating element comprises a pneumatic bladder that inflates to urge the actuating element apart from the seatback and the headrest to move forward and rotate downward relative to the seatback, and deflates to move the actuating element toward the seatback and the headrest to move rearward and rotate upward relative to the seatback.

7. The adjustable headrest according to claim 1, wherein the actuating element comprises spaced apart elongate pneumatic bladders supported on a frame.

8. The adjustable headrest according to claim 1, wherein movement of the actuating element relative to the seatback producing an angle therebetween produces an equal and opposite angle between the seatback and the headrest.

9. The adjustable headrest according to claim 1, wherein the headrest is selectively moveable relative to the seatback between a first position substantially flush and at the same angle as the seatback, and a second position forward of the seatback and at an angle thereto.

10. The adjustable headrest according to claim 9, wherein the headrest is biased toward the first position.

11. An aircraft passenger seat, comprising:
    a seatback selectively adjustable between upright and reclined positions; and
    a headrest moveable relative to the seatback, the headrest configured to simultaneously horizontally translate and rotate relative to the seatback, the headrest moveable via an actuating element positioned behind the seatback that urges against the seatback to drive the simultaneous horizontal translation and rotation of the headrest, the actuating element and the headrest interconnected through linkage.

12. The adjustable headrest according to claim 11, wherein the headrest is selectively moveable relative to the seatback between a first position substantially flush and at the same angle as the seatback, and a second position forward of the seatback and at an angle thereto, and wherein the headrest is biased toward the first position.

13. The adjustable headrest according to claim 11, wherein movement of the actuating element relative to the seatback producing an angle therebetween produces an equal and opposite angle between the seatback and the headrest.

14. The aircraft passenger seat according to claim 11, wherein the linkage is arranged symmetrically adjacent sides of the seatback.

15. The aircraft passenger seat according to claim 11, wherein the linkage comprises:
  a headrest support arm attached to the headrest;
  an actuating element support arm attached to the actuating element;
  a first link linking movement of the headrest support arm with movement of the actuating element support arm, the first link being pivotally connected to each of the seatback and the headrest support arm; and
  a second link linking movement of the headrest support arm with movement of the actuating element support arm, the second link being pivotally connected to each of the actuating element support arm and the headrest support arm.

16. The aircraft passenger seat according to claim 15, wherein the pivotal connection of the headrest support arm and the first link is guided within a slot defined by the actuating element support arm spaced apart from the attachment point of the actuating element and the actuating element support arm.

17. The aircraft passenger seat according to claim 11, wherein the actuating element comprises a pneumatic bladder that inflates to urge the actuating element apart from the seatback and the headrest to move forward and rotate downward relative to the seatback, and deflates to move the actuating element toward the seatback and the headrest to move rearward and rotate upward relative to the seatback.

18. The adjustable headrest according to claim 11, wherein the actuating element comprises spaced apart elongate pneumatic bladders supported on a frame that seat against the seatback.

* * * * *